Patented Aug. 19, 1930

1,773,296

UNITED STATES PATENT OFFICE

DAVID JULIAN BLOCK, OF CHICAGO, ILLINOIS, ASSIGNOR TO EDWARD BROCH

FOOD PRODUCT

No Drawing.    Application filed March 29, 1928.   Serial No. 265,823.

This invention relates to a food product and more particularly to a product in the nature of a prepared breakfast food of the quick cooking type.

Many farinaceous breakfast foods, and more especially the oatmeal variety, require a rather prolonged cooking, during which the product becomes pasty and gelatinous, due to the starch in the farinaceous materials. To some people the gelatinous nature of the cooked product is unpleasing and renders the braekfast food unappetizing. Even the so-called quick cooking breakfast foods, which are generally merely partially pre-cooked products, take on a more or less pasty appearance during the final cooking. The present invention, therefore, has for its object to provide a prepared breakfast food that not only requires a very short total cooking time but that in cooked condition is free from pasty and gelatinous qualities.

Other and further important objects of this invention will become apparent from the following description and appended claim.

I have found that the sticky, pasty nature of cooked breakfast foods is due to the presence of starches and that this condition may be avoided by the use of hydrolyzing enzymes to effect the conversion of the starches into sugars. At the same time, conversion of the starches into sugars by means of the enzymes eliminates the necessity of prolonged cooking.

Either the enzymes in substantially isolated form may be added or materials containing enzymes. Malt, which contains the enzyme diastase, is the effective material preferred. The malt or other enzyme containing material may be mixed with a large number of grains or farinaceous materials, such as barley, wheat and oats either singly or in combination, in order to produce a satisfactory breakfast food.

My preferred composition for a malto-milk breakfast food is as follows:

Barley grits_____ 10 lbs. 10 oz.
Cracked wheat_____ 8 lbs. 12 oz.
Steel cut oats_____ 9 lbs. 6 oz.
Finely ground malt_____ 26 lbs.
Granulated sugar_____ 18 lbs. 10 oz.
Skimmed milk powder_____ 24 lbs. 4 oz.
Salt_____ 2 lbs. 6 oz.

In cooking a prepared breakfast food such as the above with water, only 5 to 10 minutes is required. Furthermore, the product may be cooked over a direct flame without using a double boiler since the product remains substantially in separate granules and non-gelatinous.

It will be understood that my breakfast food composition as prepared for marketing comprises various cereal ingredients in an uncooked form and in this respect differs from the so-called quick cooking type of breakfast cereals now on the market, since the latter are always, to the best of my knowledge, precooked before being placed on the market. In my product, the presence of high diastatic malt renders a precooking or a prolonged cooking of the composition unnecessary, but five to ten minutes of boiling being required to bring my product into an easily digestible state.

I am aware that numerous details of the process may be varied through a wide range without departing from the principles of this invention, and I, therefore, do not purpose limiting the patent granted hereon otherwise than necessitated by the prior art.

I claim as my invention:

A quick cook breakfast food, comprising a dry mixture of uncooked farinaceous material and high diastatic malt, the malt being approximately 26 percent of the dry mixture so that the mixture upon being boiled with water for five to ten minutes forms a digestible non-gelatinous mass composed of substantially separate granules.

In testimony whereof I have hereunto subscribed my name.

D. JULIAN BLOCK.